United States Patent
Mimura et al.

(10) Patent No.: US 9,777,587 B2
(45) Date of Patent: Oct. 3, 2017

(54) SEAL APPARATUS OF TURBINE AND THERMAL POWER SYSTEM

(71) Applicant: KABUSHIKI KAISHA TOSHIBA, Tokyo (JP)

(72) Inventors: Yuki Mimura, Yokohama (JP); Akihiro Onoda, Yokohama (JP); Tomohiko Tsukuda, Yokohama (JP); Naoki Shibukawa, Saitama (JP); Toshio Hirano, Yokohama (JP); Iwataro Sato, Hiratsuka (JP); Kazutaka Tsuruta, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 861 days.

(21) Appl. No.: 13/783,540

(22) Filed: Mar. 4, 2013

(65) Prior Publication Data

US 2014/0020359 A1 Jan. 23, 2014

(30) Foreign Application Priority Data

Jul. 20, 2012 (JP) ................. 2012-161714

(51) Int. Cl.
*F01D 11/08* (2006.01)
*F01D 9/06* (2006.01)
*F01D 11/00* (2006.01)
*F01D 25/12* (2006.01)

(52) U.S. Cl.
CPC .............. *F01D 11/08* (2013.01); *F01D 9/065* (2013.01); *F01D 11/001* (2013.01); *F01D 25/12* (2013.01)

(58) Field of Classification Search
CPC ........ F01D 11/08; F01D 11/10; F01D 11/001; F01D 11/02; F01D 11/24; F01D 9/065; F01D 25/12
See application file for complete search history.

(56) References Cited

U.S. PATENT DOCUMENTS

| 3,291,447 A * | 12/1966 | Brandon ................ 415/111 |
| 4,057,362 A * | 11/1977 | Schwaebel ............. 415/173.6 |
| 5,399,065 A * | 3/1995 | Kudo et al. ............ 415/115 |
| 2004/0253100 A1* | 12/2004 | Blatchford et al. ..... 415/208.1 |

(Continued)

FOREIGN PATENT DOCUMENTS

| CN | 102076939 A | 5/2011 |
| JP | 56-4723 B2 | 1/1981 |

(Continued)

OTHER PUBLICATIONS

Office Action issued Sep. 1, 2015 in Japanese Patent Application No. 2012-161714 (with English language translation).

(Continued)

*Primary Examiner* — Charles Freay
*Assistant Examiner* — Kenneth J Hansen
(74) *Attorney, Agent, or Firm* — Oblon, McClelland, Maier & Neustadt, L.L.P.

(57) ABSTRACT

A sealing device for a turbine has a sealing member provided in a gap between a rotor and a stator arranged to surround the rotor, and a fluid path provided within the stator, to introduce, into the stator, a cooling medium used to cool stationary blades extending radially inward from the stator, and to flow the cooling medium at least to an upstream side of the sealing member.

8 Claims, 9 Drawing Sheets

(56) References Cited

U.S. PATENT DOCUMENTS

| | | | | |
|---|---|---|---|---|
| 2008/0008582 A1* | 1/2008 | Pickens | ............... | F01D 11/001 415/174.2 |
| 2009/0324388 A1* | 12/2009 | Takamura et al. | ............ | 415/116 |
| 2011/0171005 A1* | 7/2011 | Ito | .......................... | F01D 5/081 415/115 |

FOREIGN PATENT DOCUMENTS

| | | |
|---|---|---|
| JP | 57-116103 A | 7/1982 |
| JP | 60-56863 U | 4/1985 |
| JP | 7-19005 A | 1/1995 |
| JP | 2008-309051 A | 12/2008 |
| JP | 2009-203860 A | 9/2009 |
| WO | WO 2012/040214 A1 | 3/2012 |

OTHER PUBLICATIONS

Office Action issued Aug. 19, 2015 in Chinese Patent Application No. 201310072367.X (with English language translation).

Combined Chinese Office Action and Search Report issued Dec. 23, 2014 in Patent Application No. 201310072367.X (with English Translation and English Translation of Category of Cited Documents).

* cited by examiner

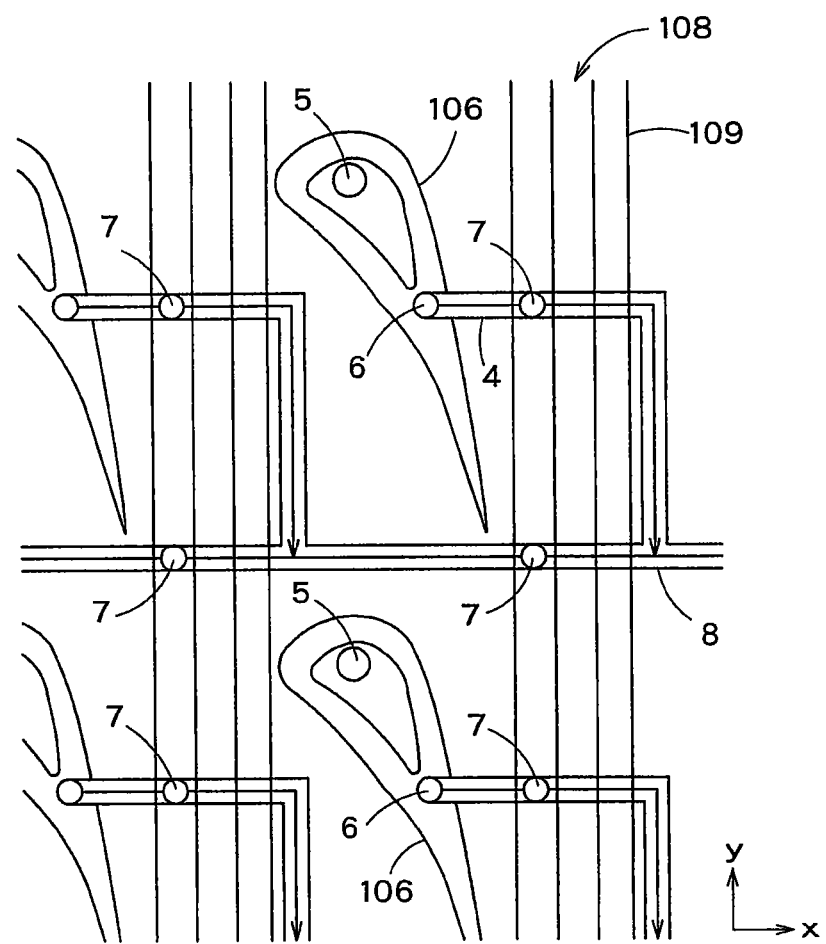
F I G. 3

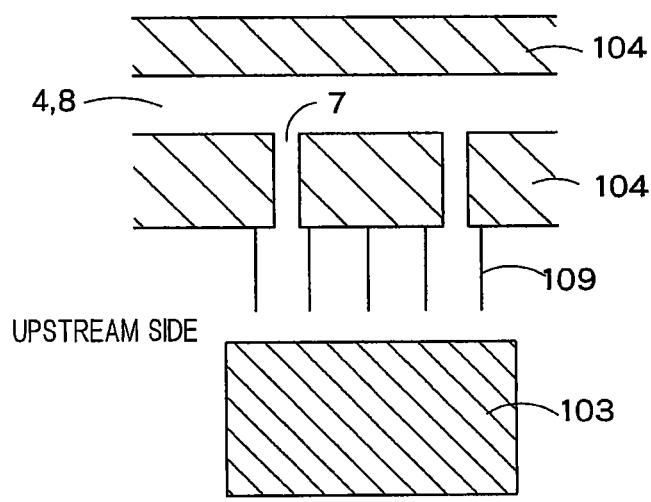
F I G. 6
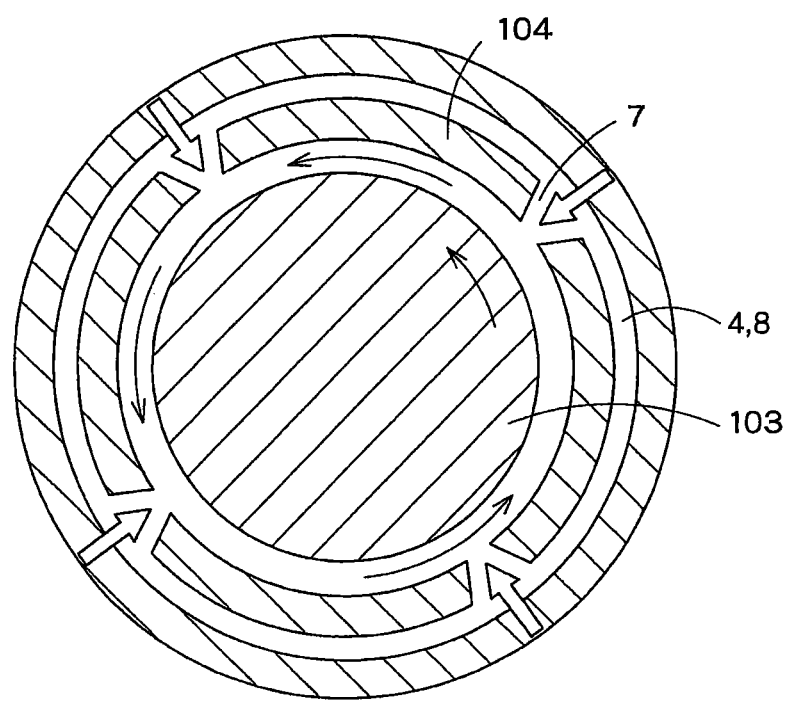
F I G. 7

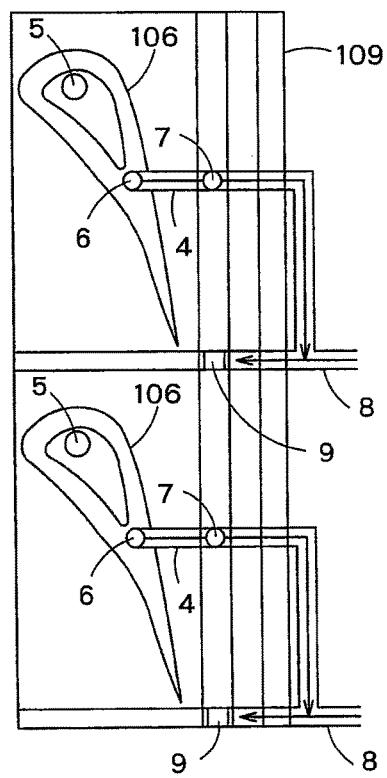
F I G. 8
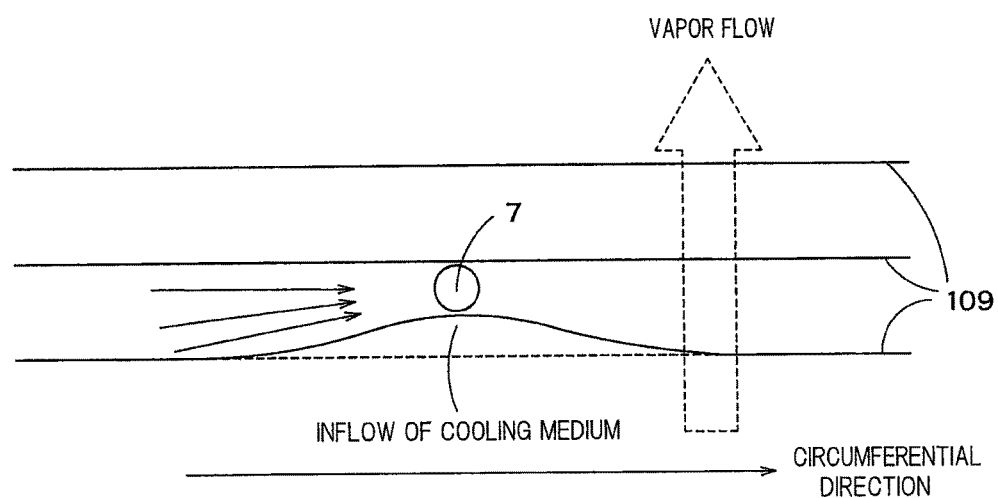
F I G. 9

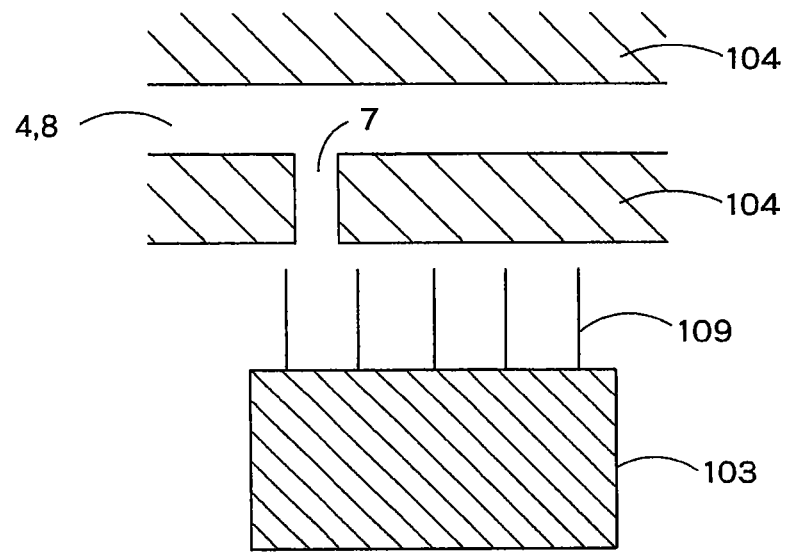
F I G. 10
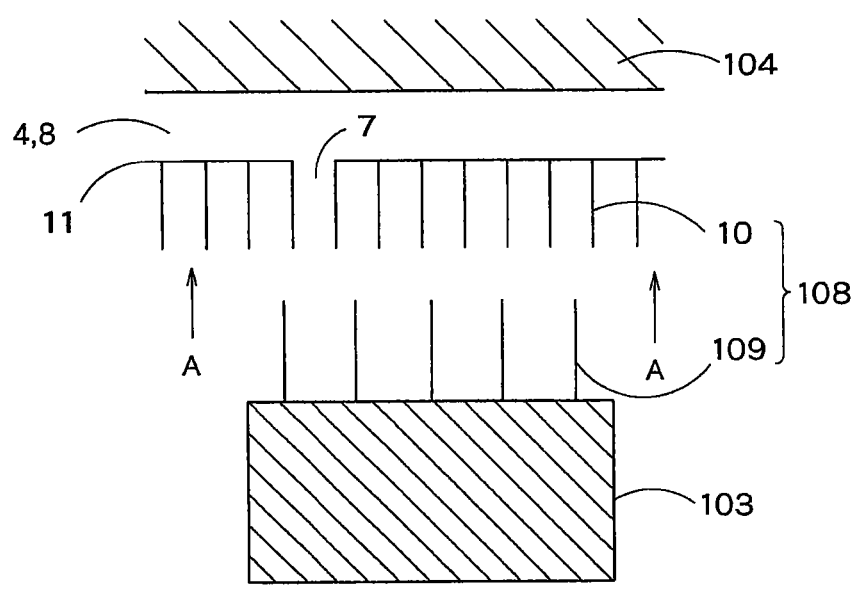
F I G. 11

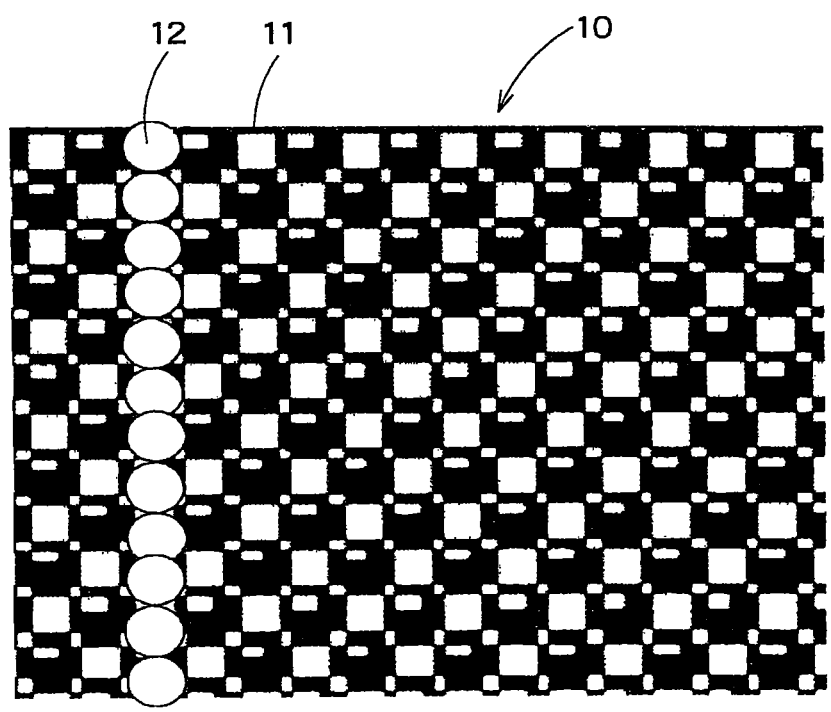
F I G. 12

SEAL APPARATUS OF TURBINE AND THERMAL POWER SYSTEM

CROSS REFERENCE TO RELATED APPLICATIONS

This application is based upon and claims the benefit of priority from the prior Japanese Patent Application No. 2012-161714, filed on Jul. 20, 2012, the entire contents of which are incorporated herein by reference.

FIELD

Embodiments of the present invention relate to of sealing device for a turbine and to a thermal power generating system.

BACKGROUND

In a steam turbine as an example of turbo-type fluid machines, fluid composed of high-temperature and high-pressure vapor is used as a working fluid to rotate a turbine rotor at high speed. A stator is arranged to face the outer circumferential surface of the turbine rotor. A gap is provided between the outer circumferential surface of the turbine rotor and the inner circumferential surface of the stator so as not to contact the Inner circumferential surface of the stator when the turbine rotor rotates.

Since the fluid leaked through this gap is not used to rotate and drive the turbine rotor, a sealing device is provided to restrain the fluid leaked from the gap as much as possible.

The sealing device has many noncontact-type sealing fins arranged on the outer circumferential surface of the turbine rotor or on the inner circumferential surface of the stator. The gap between the leading edges of the sealing fins and the surface facing thereto is narrowed as much as possible to reduce flow volume of the leakage fluid.

However, fluid leakage is still caused even when the sealing device is provided. When leakage flow velocity in the sealing device is displaced in the radial direction while keeping circumferential components, pressure distribution in the sealing device is unbalanced in the circumferential direction, causing fluid force destabilizing the turbine rotor. This destabilizing fluid force is caused mainly by the swirling flow components on the upstream side of the sealing device.

Destabilizing force is increased as swirling flow components are increased, which easily causes unstable self-excited vibration of the turbine rotor. This is the fact based on experiences, model tests and fluid analysis programs, and it is made clear that reducing the swirling flow components on the upstream side of the sealing device is effective in restraining self-excited vibration of the shaft. Such self-excited vibration is known as "steam whirl" in the field of steam turbines, and this is a problem involved with the increase in steam pressure.

BRIEF DESCRIPTION OF THE DRAWINGS

FIG. 3 is a plane view showing an example of a fluid path 4 and a fluid path 8 connected to each other in a stator 104.

FIG. 6 Is a diagram showing an example of forming a hole 7 between sealing fins 109 in the first and second stages on the upper side and forming the hole 7 between the sealing fins 109 in the fourth and fifth stages.

FIG. 7 is a diagram showing an example of tapering the inner wall of the hole 7.

FIG. 8 is a diagram showing an example of previously forming a notch 9 before forming the hole 7 located between two stationary blades 106 adjacent to each other in the circumferential direction.

FIG. 9 is a diagram showing an example of deforming the sealing fin 109 near the hole 7 introducing a cooling $CO_2$ gas from the fluid path 4(8) to narrow the interval between the sealing fins 109 near the hole 7.

FIG. 10 is a diagram schematically showing an example of arranging the sealing fins 109 on a turbine rotor 103.

FIG. 11 is a diagram showing an example of providing a honeycomb sheet 10 on the stator 104 so that the honeycomb sheet 10 faces the sealing fins 109 provided on the turbine rotor 103.

FIG. 12 is a plane view of the honeycomb sheet 10.

DETAILED DESCRIPTION

According to one embodiment, a sealing device for a turbine has a sealing member provided in a gap between a rotor and a stator arranged to surround the rotor, and a fluid path provided within the stator, to introduce, into the stator, a cooling medium used to cool stationary blades extending radially inward from the stator, and to flow the cooling medium at least to an upstream side of the sealing member.

Figure 1:
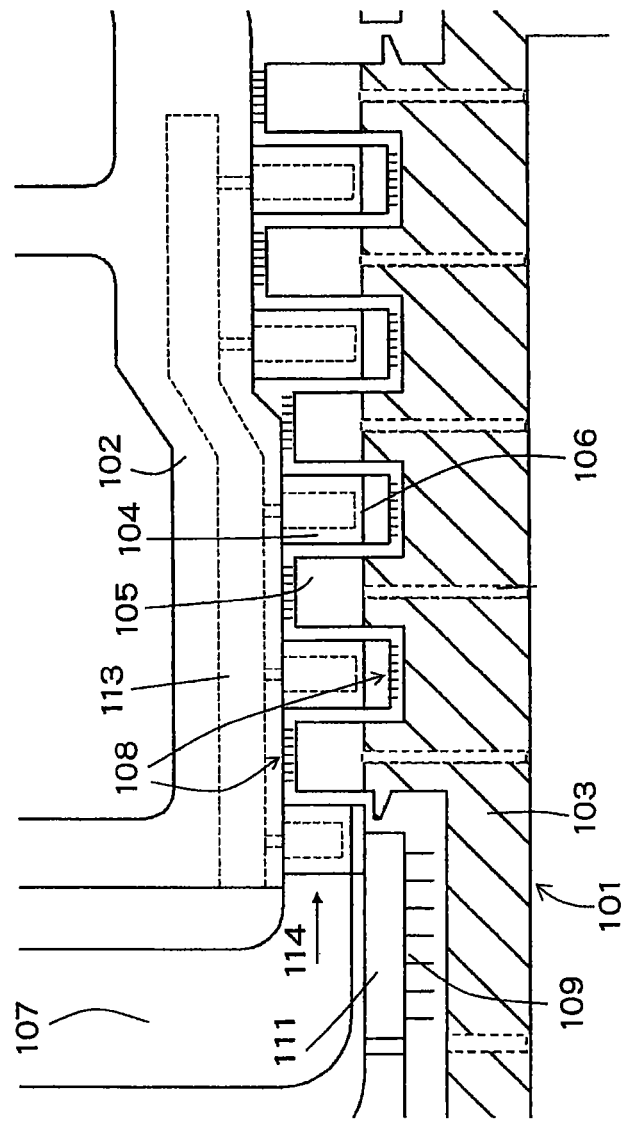
FIG. 1 is an axial sectional view of the main components of a $CO_2$ turbine 101 applicable to an embodiment.

FIG. 1 is an axial sectional view of the main components of a $CO_2$ turbine 101 applicable to an embodiment.

The $CO_2$ turbine 101 according to the present embodiment has a casing of a dual structure having an outer casing and an inner casing 102 covered by the outer casing.

Rotor blades 105 are annularly arranged at regular intervals in the outer radial direction of a turbine rotor 103. The rotor blades 105 are also arranged at predetermined intervals in the axial direction, and stationary blades 106 are arranged between the rotor blades 105 adjacent to each other in the axial direction. The stationary blades 106 are annularly arranged at regular intervals. The base of each rotor blade 105 is implanted in the outer circumferential surface of the turbine rotor 103.

FIG. 1 shows an example of a five-stage structure alternately arranging five rotor blades 105 and five stationary blades 106 in the axial direction. However, the number of stages of the rotor blades 105 and stationary blades 106 should not be particularly restricted.

The $CO_2$ turbine 101 of FIG. 1 drives the turbine rotor 103 using supercritical $CO_2$ as a working fluid, and cools each component by circulating $CO_2$ exhausted from the $CO_2$ turbine 101 and injecting $CO_2$ into the $CO_2$ turbine 101.

The critical point of $CO_2$ is 31° C. and 7.4 MPa, and the $CO_2$ turbine 101 of FIG. 1 is premised on using $CO_2$ at higher temperature and higher pressure than this critical point.

A sleeve pipe 107 is provided upstream of the $CO_2$ turbine 101 of FIG. 1, and supercritical $CO_2$ gas is injected from the sleeve pipe 107 into the turbine, as a working fluid. The injected $CO_2$ gas flows from upstream to downstream along the axial direction, and is exhausted from an exhaust pipe (not shown).

The turbine rotor 103 is rotated and driven utilizing the force generated when the fluid collides with the rotor blades 105, and the fluid leaks through a gap on the outer circumferential side of the rotor blades 105 and through the gap on the inner circumferential side of the stationary blades 106. In order to restrain this leakage, sealing devices 108 are arranged on the outer circumferential side of the rotor blades 105, and on the inner circumferential side of the stationary blades 106, respectively.

The sealing device 108 has sealing fins 109 arranged at predetermined intervals at least one on the outer circumferential surface of the rotor blades 105 and the surface of the turbine rotor 103 facing the stationary blades 106, or on the outer circumferential surface of the stationary blades 106 and the surface of the stator 104 facing the rotor blades 105. By providing the sealing device 108, the gap is narrowed to prevent the leakage of the fluid.

The sealing device 108 is provided not only on the outer circumferential surface of the rotor blades 105 or stationary blades 106 and on the surface facing the outer circumferential surface, but also on a ground packing 111 arranged on the upper side of the stationary blades 106 In the uppermost stage.

Even when the sealing device 108 is provided, high-temperature fluid flows on the outer circumferential surface of the rotor blades 105 and stationary blades 106, and thus the rotor blades 105 and the stationary blades 106 are exposed to high temperature. Accordingly, in the $CO_2$ turbine 101 of FIG. 1, the rotor blades 105 and the stationary blades 106 may be cooled using low-temperature $CO_2$ gas (hereinafter referred to as cooling $CO_2$ gas) supplied from the outside.

A part of the cooling $CO_2$ gas passes through a fluid path 113 provided in the inner casing 102, to be utilized to cool the stationary blades 106. $CO_2$ gas used to cool the stationary blades 106 is reused to rotate and drive the turbine rotor 103, after joining the main flow passing through a fluid path 114 to drive the rotor blades 105.

As stated above, swirling flow components in the sealing device 108 particularly on the upstream side causes fluid force destabilizing the turbine rotor 103, and self-excited vibration of the turbine rotor 103 is easily caused. To prevent this phenomenon, the sealing device 108 of the $CO_2$ turbine according to the present embodiment is characterized in its structure.

Figure 2:
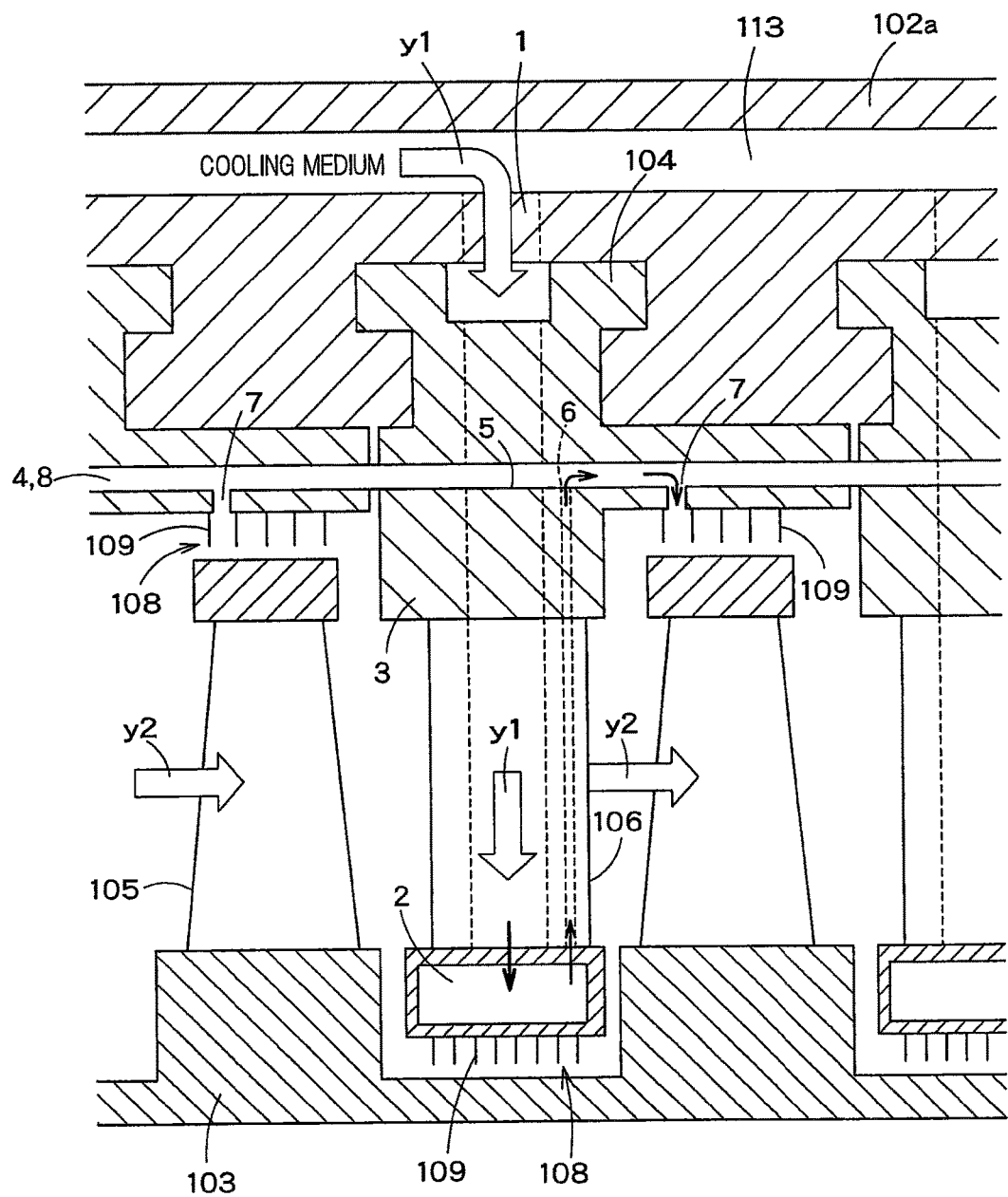
FIG. 2 is an enlarged sectional view of the periphery of a sealing device 108.

FIG. 2 is an enlarged sectional view of the periphery of the sealing device 108. In FIG. 2, an arrow y1 shows a path of the cooling $CO_2$ gas (cooling medium) flowing from the fluid path 113 in the inner casing 102 into the stationary blade 106 through a fluid path 1 branched from the fluid path 113, and an arrow y2 shows a main flow path of high-temperature and high-pressure $CO_2$ gas for generating power.

As shown in FIG. 2, the cooling $CO_2$ gas flowing through the fluid path 113 provided in the inner casing 102 passes through the fluid path 1 provided on the base side of the stationary blade 106, and is introduced into the stationary blade 106 through the stator 104, to cool the stationary blade 106. The cooling $CO_2$ gas reached an inner ring 2 of the stationary blade 106 returns to an outer ring 3 of the stationary blade 106, and flows into a fluid path 4 provided in the stator 104.

FIG. 3 is a plane view showing an example of the fluid path 4 and a fluid path 8 connected to each other in the stator 104. Note that FIG. 3 is a plane view in the case of seeing the turbine rotor 103 from the fluid paths 4 and 8. In FIG. 3, x-direction represents the axial direction, and y-direction represents the circumferential direction. The stationary blades 106 and the sealing fins 109 extend toward the back side of the sheet of FIG. 3.

As shown in FIG. 2 and FIG. 3, the cooling $CO_2$ gas is introduced into the stationary blade 106 from a hole 5 formed in the stator 104 and connected to the fluid path 1 branched from the fluid path 113 in the inner casing 102. This cooling $CO_2$ gas passes through the inner ring 2 of the stationary blade 106 and flows into the fluid path 4 in the stator 104, from a hole (first hole) 6 on the outer circumferential surface of the outer ring 3. The fluid path 4 connected to this hole 6 extends in the axial direction, passes through a hole (second hole) 7 on the sealing device 108, and then changes the course in the circumferential direction to join the fluid path 8. This fluid path 8 extends in the axial direction of the stator 104, and flows the cooling $CO_2$ gas used to cool a plurality of stationary blades 106 arranged at the same circumferential position in the axial direction. The hole 7 is also provided in the fluid path 8.

In this way, the fluid path 8 is provided corresponding to a plurality of stationary blades 106 arranged at the same circumferential position in the axial direction of the stator 104. Accordingly, if n (n is an integer of 2 or greater) stationary blades 106 are arranged in the circumferential direction, n fluid paths 8 are provided at predetermined intervals in the axial direction.

In FIG. 3, two holes 7 are provided for one stationary blade 106, and each of the holes 7 is arranged between the sealing fins 109 in the first and second stages on the upstream side. One hole 7 is provided on the fluid path 4, while the other hole 7 is provided on the fluid path 8. The cooling $CO_2$ gas flowing into the fluid path 4 from the hole 6 of the outer ring 3 of the stationary blade 106 partially flows into these holes 7 and cools the periphery of the sealing fins 109.

Note that there is no particular restriction on the number of holes 7 to be provided for one stationary blade 106. As mentioned later, it is unnecessary to provide the hole 7 between the sealing fins 109 in the first and second stages on the upper side, but the hole 7 should be desirably provided between the sealing fins 109 on the upper side in view of the reduction in swirling flow components.

As stated above, the cooling $CO_2$ gas used to cool a plurality of stationary blades 106 arranged at the same circumferential position in the axial direction flows through the fluid path 8 formed in the stator 104 and extending in the axial direction. Thus, if the hole 7 is provided on this fluid path 8 corresponding to the position of the sealing fins 109, the flow volume of cooling $CO_2$ gas flowing toward the sealing fins 109 from this hole 7 can be increased, which makes it possible to improve the cooling effect of the sealing fins 109. By cooling the sealing fins 109, the sealing fins 109 can be restrained from being deformed and can be improved in durability.

Further, by flowing the cooling $CO_2$ gas from the hole 7 toward the sealing fins 109, swirling flow components generated around the sealing device 108 can be reduced.

Figure 4:
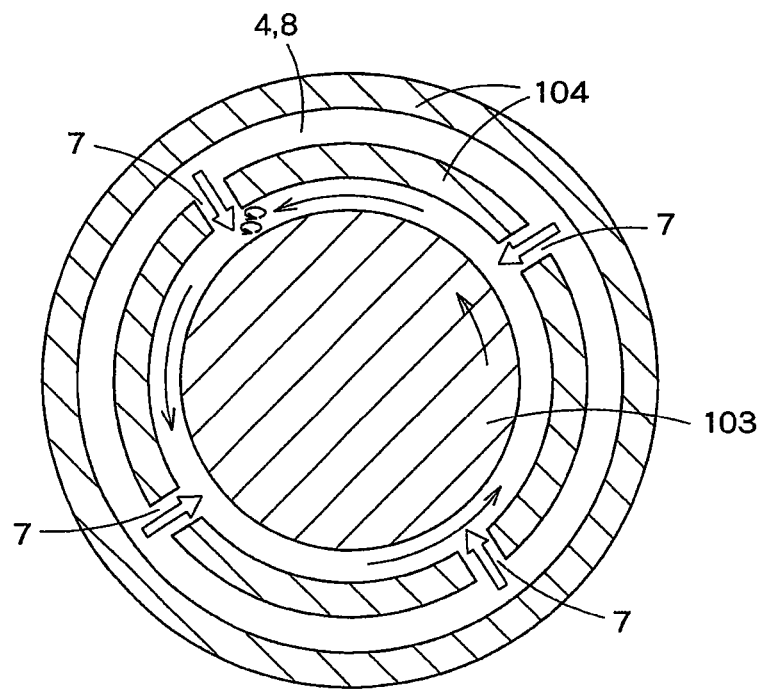
FIG. 4 is a diagram for explaining reasons why swirling flow components can be reduced.

FIG. 4 is a diagram for explaining reasons why swirling flow components can be reduced. This is a diagram schematically showing a cross section structure of the turbine rotor 103 and stator 104 in the circumferential direction. As shown in FIG. 4, the cooling $CO_2$ gas flowing through the hole 7 on the fluid path 4(8) is injected between the sealing fins in the first and second stages on upstream side and then flows in the radial direction. On the other hand, swirling flow components are formed in the circumferential direction of the turbine rotor 103. Since the cooling $CO_2$ gas obstructs the flow of swirling flow components, swirling flow components can be reduced.

Figure 5:
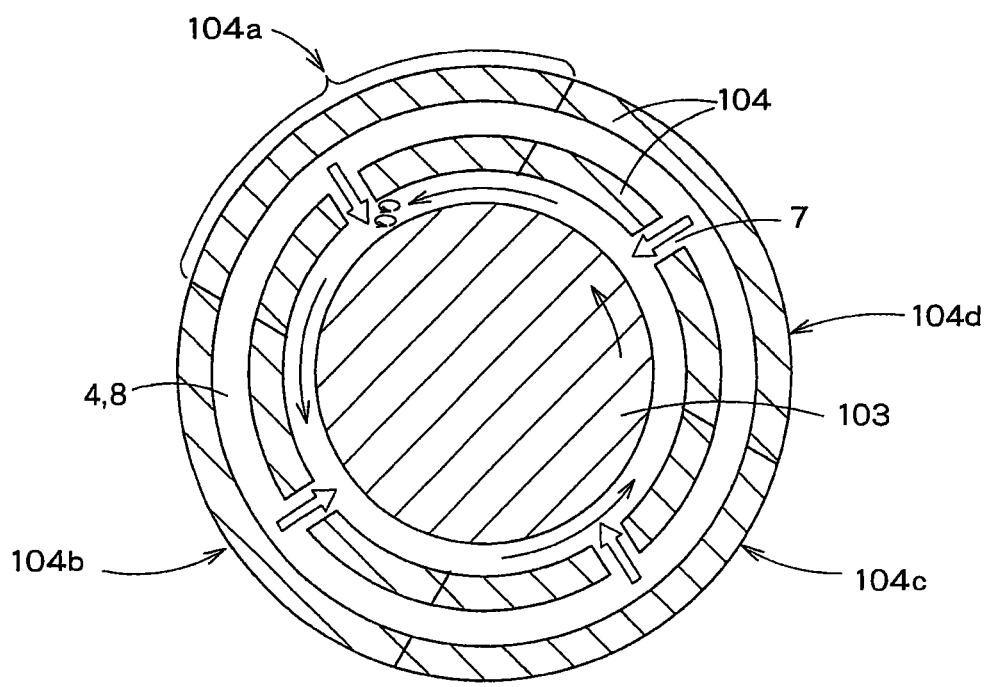
FIG. 5 is a diagram showing a modification example derived from FIG. 4.

FIG. 5 is a diagram showing a modification example derived from FIG. 4. FIG. 5 shows an example of dividing the stator 104 into a plurality of segments (segment structures) 104a to 104d. In the example of FIG. 5, the stator 104 is divided into four segments 104a to 104d, and each segment has the fluid paths 4 and 8 and the holes 7 led to the sealing fins 109.

By dividing the stator 104 into the segments 104a to 104d as shown in FIG. 5, the fluid paths 4 and 8 and the holes 7 can be processed and formed easily, and efficiency in assembling the stator 104 can be improved.

Note that the number of segments is not necessarily limit to four. Considering the efficiency in manufacturing and assembling the stator 104, the number of segments should be determined depending on the number of holes 7 and fluid paths 4 and 8 to be provided in the circumferential direction. That is, by providing the holes 7 and the fluid paths 4 and 8 in each segment, the stator 104 can be manufactured relatively easily since the stator 104 can be assembled easily.

In the examples shown in FIG. 2 and FIG. 3, the holes 7 are formed between the sealing fins 109 in the first and second stages on the upper side, but the holes 7 may be formed between the sealing fins 109 in the stages following the second stage. FIG. 6 is shows an example of forming the holes 7 between the sealing fins 109 in the first and second stages on the upper side and forming the holes 7 between the sealing fins 109 in the fourth and fifth stages. By such a structure, it is possible to reduce the swirling flow components on the downstream side of the sealing device 108, in addition to the swirling flow components on the upstream side of the sealing device 108.

In FIGS. 1 to 5 explained above, there is no particular limitation on the shape of the holes 7 for introducing the cooling $CO_2$ gas from the fluid path 4(8) toward the sealing fins 109. Note that it is desirable to increase the flow velocity of the cooling $CO_2$ gas flowing from the holes 7 toward the sealing fins 109 in order to reduce swirling flow components in the sealing device 108 while cooling the sealing fins 109. Accordingly, in the example shown in FIG. 7, the inner wall of the hole 7 is tapered. The hole diameter each hole 7 of FIG. 7 becomes smaller as approaching the sealing fins 109 and the rotor 103. Accordingly, the pressure of the cooling $CO_2$ gas passing through the holes 7 becomes higher as approaching the sealing fins 109, thereby increasing the flow velocity of the cooling $CO_2$ gas. Therefore, swirling flow components can be reduced more effectively while improving the cooling effect of the sealing device 108.

There is no need to taper all of the holes 7 on the fluid paths 4 and 8, and only a part of the holes 7 may be tapered. In order to form the tapered hole 7 easily, a notch may be preliminarily formed on the fluid paths 4(8) at the position where the tapered hole 7 should be formed.

For example, FIG. 8 Is shows an example of preliminarily forming a notch 9 before forming the hole 7 located between two stationary blades 106 adjacent to each other in the circumferential direction. The shape of the notch 9 is not limited, and it may be semicircular, for example. When such a notch 9 is preliminarily formed, the tapered hole as shown in FIG. 7 can be formed easily by drilling the center of the notch 9.

FIG. 7 shows a technique for increasing the flow velocity of the cooling $CO_2$ gas. However, it is also possible to reduce swirling flow components of the working fluid by controlling the part involved with swirling flow components, instead of or in addition to increasing the flow velocity of the cooling $CO_2$ gas. For example, FIG. 9 shows an example of deforming the sealing fin 109 near the hole 7 introducing the cooling $CO_2$ gas from the fluid path 4(8) to narrow the interval between the sealing fins 109 near the hole 7. In FIG. 9, the sealing fin 109 extending in the circumferential direction is partially deformed. More concretely, the interval between the sealing fins 109 near the hole 7 connected to the fluid path 4(8) is partially narrowed so that the flow velocity of the cooling $CO_2$ gas is temporarily increased in this narrowed region.

Since the interval between the adjacent sealing fins 109 is partially narrowed, swirling flow components of the working fluid flowing therebetween are gathered in the narrowed area. Thus, by flowing the cooling $CO_2$ gas into this area, swirling flow components can be reduced effectively.

In the examples shown in FIGS. 1 to 9 explained above, the sealing fins 109 are lined up on the stator 104 side, but the sealing fins 109 may be lined up on the turbine rotor 103 side. FIG. 10 is a diagram schematically showing an example of arranging the sealing fins 109 on the turbine rotor 103. More concretely, the sealing fins 109 are arranged on the leading edge surface of the rotor blades 105 implanted in the turbine rotor 103, and on surface of the turbine rotor 103 facing the stationary blades 106 implanted in the stator 104.

When the sealing fins 109 are provided on the turbine rotor 103 side, heat possibly generated when the leading edges of the sealing fins 109 are contacted with the stator 104 is not transmitted to the turbine rotor 103. Therefore, it is possible to effectively restrain rubbing vibration and thermal expansion caused by the contact of the sealing fins 109, compared to the case where the sealing fins 109 are provided on the stator 104 side.

As an example of modifying FIG. 10, FIG. 11 shows providing a honeycomb sheet 10 on the stator 104 so that the honeycomb sheet 10 faces the sealing fins 109 provided on the turbine rotor 103. The honeycomb sheet 10 has a merit in that axial self-excited vibration of the shaft can be restrained, but has a demerit in its durability since the honeycomb structure is damaged by the pressure difference between the upstream side and the downstream side.

Accordingly, the honeycomb sheet 10 of FIG. 11 has the hole 7 for flowing the cooling $CO_2$ gas from the fluid path 4(8) to the upstream side of the sealing fins 109.

FIG. 12 is a plane view of the honeycomb sheet 10. The honeycomb sheet 10 has a stitch (honeycomb) structure on a basal plate 11. The stitch structure passes through the fluid, but the basal plate 11 blocks the passing of the fluid. Thus, the fluid cannot pass through the basal plate 11 if the honeycomb sheet 10 is not processed.

Accordingly, as shown in FIG. 12, a plurality of predetermined sized holes 12 are formed in a line in the longitudinal direction of the basal plate 11 so that the cooling $CO_2$ gas from the fluid path can flow toward the sealing fins 109 through these holes 12. Note that where and how many holes 12 should be formed in the basal plate 11 may be arbitrarily determined, and a desired number of holes 12 should be formed corresponding to the position of the sealing fins 109.

By forming such holes 12 to flow the cooling $CO_2$ gas toward the sealing fins, pressure difference can be reduced, which makes it possible to use the honeycomb sheet 10 without causing a problem in durability.

As stated above, in the present embodiment, the fluid paths 4 and 8 are provided in the stator 104 in order to pass the cooling $CO_2$ gas used to cool the stationary blades 106, and the hole 7 is formed to flow the cooling $CO_2$ gas from the fluid path 4(8) toward the sealing fins 109 in the sealing device 108. Therefore, it is possible to reduce swirling flow components generated around the sealing fins 109 while cooling the sealing fins 109 efficiently.

FIGS. 2 to 12 shows examples for reducing swirling flow components generated around the sealing fins 109 in the $CO_2$ turbine shown in FIG. 1 while cooling the sealing fins 109. However, the present invention can be applied to various turbines having the sealing device 108, and should not be necessarily limited to the sealing device 108 of the $CO_2$ turbine. That is, the present invention can be applied to the sealing device of various types of turbines 108 involved with swirling flow components generated around the sealing fins 109.

Figure 13:
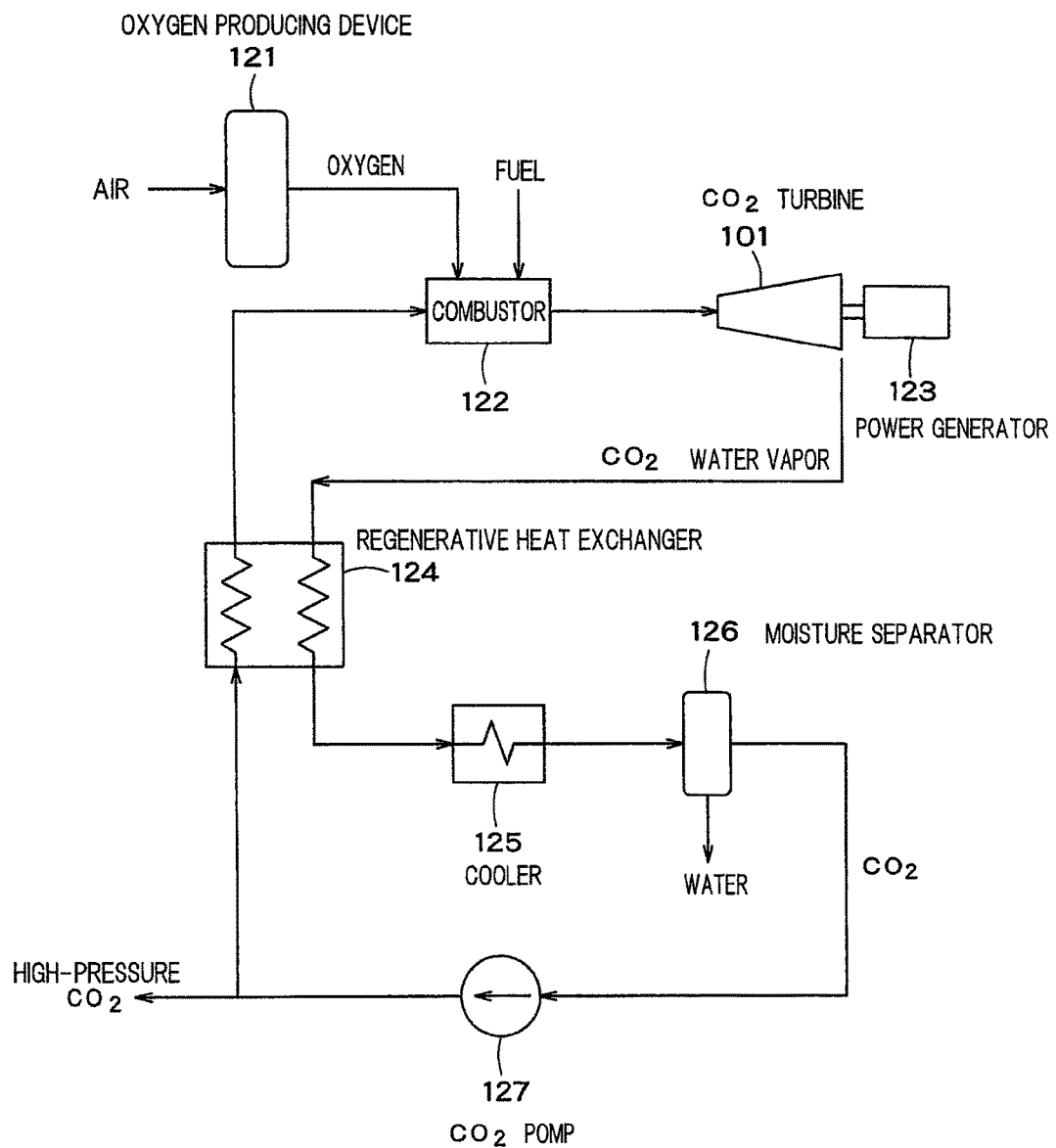
FIG. 13 is a diagram showing a schematic structure of an example of a thermal power generating system utilizing the $CO_2$ turbine 101 of FIG. 1.

The $CO_2$ turbine 101 of FIG. 1 can be Incorporated into a thermal power generating system capable of generating power while separating and recovering $CO_2$. FIG. 13 is a diagram showing a schematic structure of an example of a thermal power generating system utilizing the $CO_2$ turbine 101 of FIG. 1. A thermal power generating system 120 of FIG. 13 has an oxygen producing device 121, a combustor 122, the $CO_2$ turbine 101 shown in FIG. 1, a power generator 123, a regenerative heat exchanger 124, a cooler 125, and a moisture separator 126.

The oxygen producing device 121 extracts only oxygen by removing nitrogen contained in air. The combustor 122 generates high-temperature combustion gas using the oxygen extracted by the oxygen producing device 121, fuel, and $CO_2$. This combustion gas is composed of $CO_2$ and water. The fuel used by the combustor 122 is non-nitrogenous natural gas, such as methane gas.

The high-temperature and high-pressure $CO_2$ gas generated by the combustor 122 is injected into the $CO_2$ turbine 101 shown in FIG. 1, and used to rotate and drive the turbine rotor 103. The rotating shaft of the turbine rotor 103 is connected to the power generator 123, and the power generator 123 generates power utilizing the rotational driving force of the turbine rotor 103.

$CO_2$ and water vapor emitted from the $CO_2$ turbine 101 are cooled by the regenerative heat exchanger 124, and then further cooled by the cooler 125. After that, water is removed by the moisture separator 126, and only $CO_2$ is extracted. This $CO_2$ is compressed and pressurized by a $CO_2$ pump.

A part of the high-pressure $CO_2$ pressurized by the $CO_2$ pump is heated by the regenerative heat exchanger 124 up to about 400° C. $CO_2$ emitted from the regenerative heat exchanger 124 is used as cooling $CO_2$ for cooling the $CO_2$ turbine 101, and also supplied to the combustor 122.

In the high-pressure $CO_2$ pressurized by the $CO_2$ pump, surplus $CO_2$ which is not reused to generate power through the regenerative heat exchanger 124 is recovered to be stored or utilized for another purpose (e.g., to increase the amount of oil drilling).

In this way, the power generating system of FIG. 13 generates power using only $CO_2$ and water generated through combustion, and most of $CO_2$ is circulated and reused. Accordingly, NOx, which Is a harmful gas, is not emitted, and there is no need to additionally provide a facility for separating and recovering $CO_2$. Further, surplus $CO_2$ recovered keeping its high purity can be easily used not only for power generation but also for various other purposes.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A sealing device for a turbine,
the turbine including
a stator,
a rotor with a plurality of rotor blades, and
a plurality of stationary blades extending radially inward from the stator which is arranged to surround the rotor blades,
each of the stationary blades being cooled by a cooling medium, the sealing device comprising:
a sealing member provided in a gap between a tip of one of the rotor blades and the stator; and
a fluid path provided within the stator to introduce the cooling medium after being used to cool each of the stationary blades into the stator, and to flow the cooling medium at least to an upstream side and an adjacent area of the sealing member in a radial direction of the rotor blades.

2. The sealing device of claim 1,
wherein the fluid path comprises:
a first hole configured to take in the cooling medium after being used to cool each of the stationary blades; and
a second hole configured to flow the cooling medium at least into the upstream side of the sealing member.

3. The sealing device of claim 2,
wherein the sealing member has a plurality of sealing fins arranged in an axial direction, and
the second hole is provided between the sealing fins in first and second stages on the upstream side of the sealing fins.

4. The sealing device of claim 3,
wherein a plurality of second holes are provided, and a part of the second holes is provided between the sealing fins in stages following the second stage on the upstream side of the sealing fins.

5. The sealing device of claim 3,
wherein the second hole is provided between two sealing fins adjacent to each other, and
an interval between these two sealing fins is narrowed around the second hole.

6. The sealing device of claim 2,
wherein the second hole is tapered so that a hole diameter on a surface closer to the sealing member is smaller than a hole diameter on an opposite surface.

7. The sealing device of claim 2,
wherein the stator comprises a plurality of segment structures extending in an axial direction, each segment structure capable of being connected together in a circumferential direction, and
the second hole and the fluid path are provided in each of the segment structures.

8. The sealing device of claim 2, further comprising:
a honeycomb sheet comprising a plurality of holes opened toward an inner circumferential side, the honeycomb sheet being provided to face the sealing member on at least one of a surface of the stator facing the rotor blades, and a surface of the stationary blades facing an outer circumferential surface of the rotor, and the second hole is provided at least on an upstream side of the opening member.

* * * * *